Figure 1:
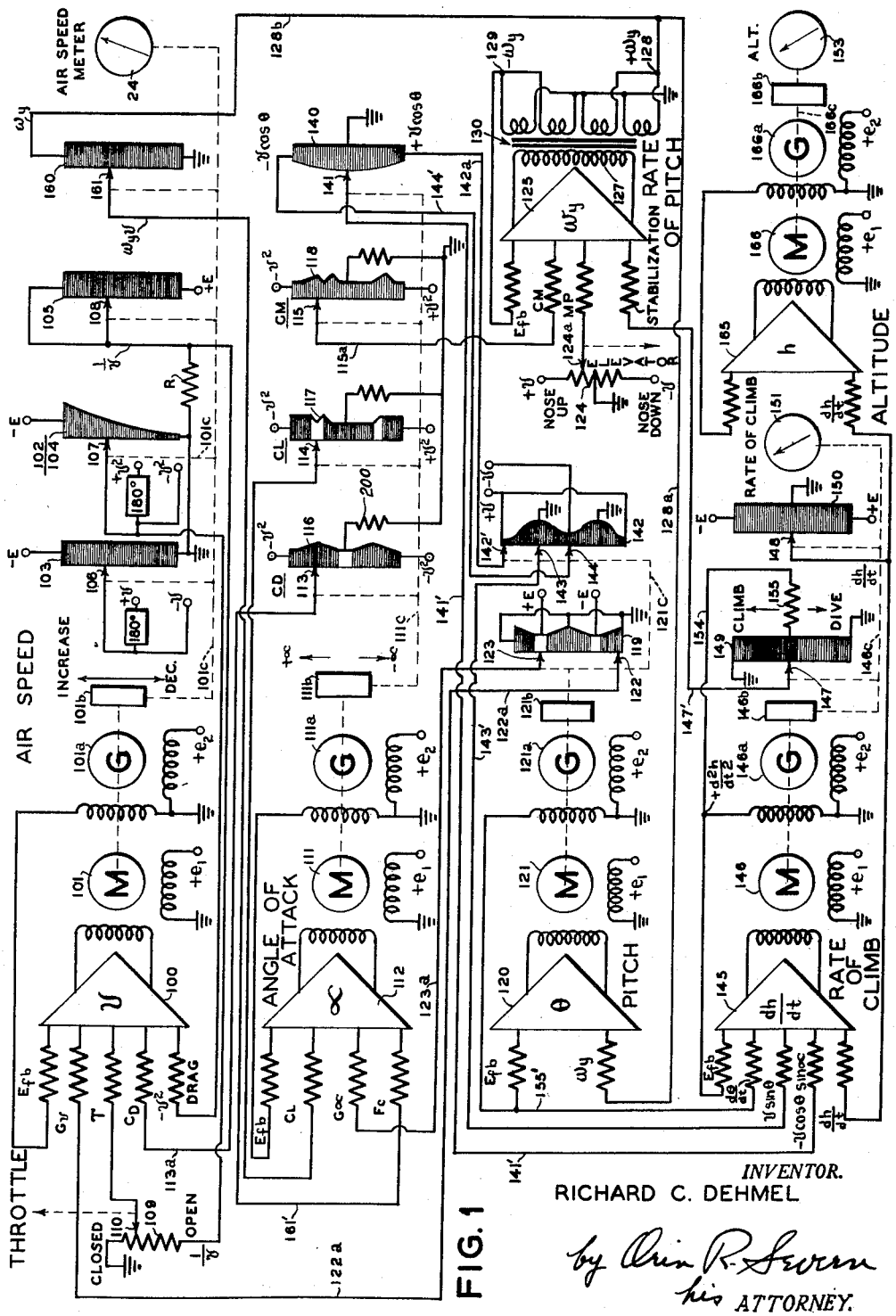

INVENTOR.
RICHARD C. DEHMEL
his ATTORNEY.

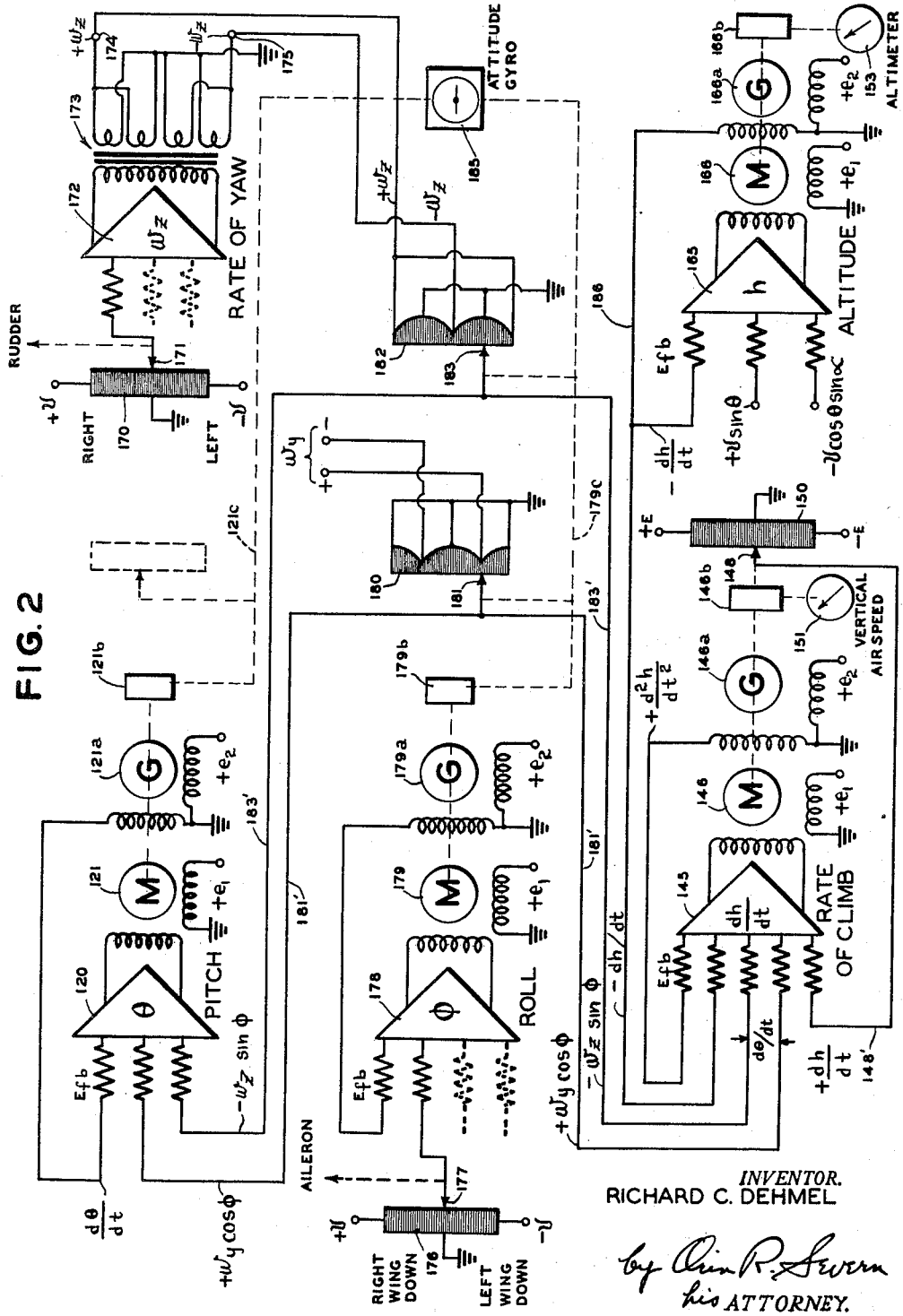

2,930,143

MOCK FLIGHT COMPUTING SYSTEM HAVING CONTROL RESPONSE CHARACTERISTICS

Richard C. Dehmel, Short Hills, N.J.

Application May 18, 1954, Serial No. 430,520

1 Claim. (Cl. 35—12)

This invention relates to ground-based mock flight computing systems for representing and indicating various flight conditions, and in particular to electronic computing systems of the interacting servo type operable in response to the operation of mock aircraft controls.

Ground-based mock flight computing systems of the aforesaid electronic type have been developed for translating movements of mock aircraft controls by a student into flight and navigation instrument readings. A system of this character is disclosed in my Patent No. 2,842,867, granted July 15, 1958, for "Flight Computing System and Apparatus." The instrument readings or indications of such apparatus, particularly when used for training aircraft personnel, should reflect the flight characteristics of the particular aircraft that is represented, especially with respect to the vertical system involving climb and dive rates.

One of the primary deficiencies in the operation of ground-based flight training apparatus is a lack of realism in the response of the mock aircraft instruments to pilot manipulation of the controls. In the longitudinal system for example, referring to the longitudinal or "X" axis of the aircraft, the "short period" oscillations and the phugoid are not realistically reproduced in either fixed-stick or stick-free modes and accordingly the response of the training apparatus to control operation does not accurately represent that of the specific aircraft represented. Similar irregularities in control response also occur in the lateral mode, i.e., with respect to operation of the yaw system. Since one of the primary purposes of ground-based flight training apparatus is to teach the trainee pilot, and also to "refresh" experienced pilots, in the proper evaluation of control derivatives or rates, it is essential that the flight stability of the training apparatus both in static and dynamic action be that of the parent aircraft. That is, it must have the same controllability as the actual airplane itself.

The principal object therefore of the present invention is to provide improved ground-based flight training and computing apparatus that is capable of more accurately representing the static and particularly the dynamic responses of the aircraft in its several modes.

A further object of the invention is to provide in the apparatus above referred to, means for improving the response of the training apparatus by modifying the action of successive computing circuits according to the rate of change of the control circuits, and specifically with respect to the longitudinal vertical system by modifying the action of the rate-of-climb circuit according to the rate-of-change of pitch angle of the corresponding circuit.

One system for improving the general overall response characteristics of the longitudinal vertical system of ground-based flight computing and indicating apparatus is disclosed in my Patent No. 2,701,922 granted February 15, 1955, for "Flight Simulating Means With Stabilizing Control." The present invention is intended to complement and/or constitute an improvement on the system of my aforesaid patent.

In accordance with the present invention, a flight computing system of the interacting servo type such as that generally disclosed in my above Patent Number 2,842,867, is provided with means for deriving a control quantity, such as a control voltage, corresponding to a function of angular rate of change of the aircraft about one of its axes, such as the pitch axis, and this quantity is in turn used as a modifying control quantity for means representing a function of the translation of this axis in space, such as the rate-of-climb or altitude means respectively, whereby transient responses are accurately simulated and the flight trainer instruments react realistically for all simulated transient conditions, such as those of climb and dive. Specifically, the present invention can be used to advantage in the system disclosed in my aforesaid Patent No. 2,701,922, but is not limited thereto and can, if desired, be used independently of the vertical system stabilizing circuits disclosed in said application. It will also be understood that this invention is not limited specifically to servo motor-generator apparatus of the character shown and is equally applicable to equivalent servo circuits.

Referring to the drawings, Fig. 1 thereof is a diagrammatic illustration of a mock flight computing and indicating servo system for the vertical mode of the airplane embodying the present invention, and Fig. 2 is a similar illustration of a modified form of the invention including factors of the lateral mode of the airplane as well.

The illustrated embodiment of the invention is primarily concerned with vertical air speed and altitude response although it will be understood that the invention is also applicable as well to the lateral or yaw system. The present specification will refer to my Patent Number 2,842,867 for essential energizing circuits of units representing factors such as yaw, roll and sideslip of a lateral or yaw system.

A so-called "vertical system" involving for simplicity but elevator and throttle control will first be described in connection with Fig. 1 for computing air speed. According to well-known principles of aerodynamics air speed ($v$) is a function of engine thrust (T) which is always positive (except for propeller drag when idling in flight below about 1200 r.p.m.), gravity (G) which may be either positive or negative depending on whether the aircraft is in a dive or climb, and drag which is of course negative. Drag may be considered as having two components, (1) constant coefficient drag which varies as the square of the air speed $v^2$, and (2) drag expressed by the variable coefficient $C_D(\alpha)$ which varies with the angle of attack ($\alpha$), i.e., the angle between the chord of the wing and the air stream.

Referring now to Fig. 1, it will be assumed that a plurality of A.C. voltages representing various values of thrust, gravity and drag respectively, according to the instantaneous polarity and magnitude of the respective voltage are fed separately into a summing amplifier diagrammatically indicated at 100 included in a servo system designated "air speed." Such amplifiers are well known in the art for algebraically summing a plurality of separate A.C. voltages of varying magnitude and polarity. The output of the amplifier 100 is used to control an automatic balancing servo network including a two-phase motor 101, the control phase of which is energized by the amplifier output as illustrated and the other phase by a constant reference A.C. voltage $+e_1$. The operation of this type of motor is well-known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feed-back generator 101a also having one phase winding energized by an A.C. reference voltage $+e_2$, the other phase winding generating according to the motor speed a feed-back voltage $E_{fb}$ for purposes of rate control hereinafter described. The motor also serves to gang-operate through a gear reduction train 101b the contacts of a potentiometer system generally indicated at 102; also the pointer of the mock air speed meter 24 is directly positioned through the motor drive mechanism by suitable mechanical connections 101c between the motor and the driven elements as indicated by dotted lines.

The individual potentiometer resistance elements may be of the well-known wound card type and are of circular or band form but are diagrammatically illustrated in a plane development for clearness. Each potentiometer is shaped or contoured so that the value of the derived voltage at the potentiometer contact bears a certain relationship to the linear movement of the slider contact depending on the particular function of the potentiometer, and has a voltage impressed across its terminals depending in instantaneous polarity and magnitude also on the function of the potentiometer. According to the present invention the contour of all functional potentiometers represents the derivative of the function represented. For example, the potentiometers 103 and 105 are of the linear type whereas the potentiometer 104 is contoured to represent a relationship $x=y^2$, where $x$ represents the linear movement of the contact and $y$ represents the derived potentiometer voltage, in the present instance air speed squared.

Stated more specifically, the contour or width variation of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card is uniform, making it rectangular in shape. If now the function varies according to a square law such as $x=y^2$ the derivative of this equation $f(x)=2y$ determines the width of the potentiometer. Therefore the potentiometer has a straight line sloping edge giving it a wedge shape.

In another case where a cosine function is involved, the derivative or slope of the cosine curve may be expressed as $$\frac{d(\cos \theta)}{d\theta} = -\sin \theta$$

where $\theta$ is the angle measured in radians. Accordingly, the contour of the potentiometer card for corresponding values of $\theta$ is sine shaped, the negative value being taken care of by corresponding selection of the polarity applied to the potentiometer. Conversely where a sine function is involved the potentiometer card for corresponding values of $\theta$ will have a cosine contour.

Referring again to Fig. 1, the potentiometer 104 is energized at its upper terminal representing maximum air speed by a negative voltage $-E$ and is grounded at its lower end so that the derived voltage at the slider contact 107 represents $-v^2$ and therefore is also representative of the constant coefficient drag previously referred to. Accordingly, this voltage may be used as one of the inputs of the air speed summing amplifier 109 tending to oppose the positive thrust input voltage (T), the arrangement being such that when the effect of all input voltages to the amplifier balance out, i.e. during a period of no change in air speed, the output of the amplifier is zero and the motor 101 is deenergized. Any change in the input voltages tending to unbalance the system, either in a positive or negative direction, such as for example in level flight during a change in throttle setting when the thrust and drag voltages are unequal, causes operation of the motor 101 in a corresponding direction to move the potentiometer contacts toward a new balance position wherein newly derived voltages tend to restore balance of the motor inputs.

For the purpose of deriving a voltage proportional to air speed $v$, the linear potentiometer 103 is energized by a voltage $-E$ and the slider contact 106 is positioned according to the magnitude of air speed. This derived voltage is used in another part of the system to be described.

The thrust voltage is shown as derived from the setting of the engine throttle potentiometer 109, the contact 110 of which is directly adjusted by the pilot to simulate throttle control. This potentiometer is energized by a voltage taken from the contact 108 of potentiometer 105 that is also energized at its lower terminal by a voltage $+E$, the upper terminal being grounded through a resistance R and also directly connected to contact 103 for deriving a voltage proportional to the reciprocal of air speed $$\frac{(1)}{v}$$

so as to correspond with the relationship $$T = \frac{\text{H.P.}}{v}$$

which is simply the basic equation $$\text{H.P.} = \frac{\text{ft.-lb.}}{\text{sec.}} = vT$$

It will therefore be seen that the thrust input voltage corresponds generally to the delivered engine power as determined by throttle setting and air speed.

For the purpose of deriving a voltage representing combined functions of air speed and another flight variable for use in the computing system hereinafter described, another potentiometer 160 is controlled by the air speed servo so that the derived voltage at slider 161 represents the product of air speed and the other variable (rate of pitch) which corresponds to the voltage energizing the potentiometer.

The drag coefficient input $C_D$ for the air speed system varies, as above indicated, with the angle of attack $\alpha$. Accordingly, another servo system designated "angle of attack" is provided for deriving a set of voltages corresponding to certain factors variable with angle of attack. A two-phase motor 111 (similar to motor 101) of the angle of attack system is energized by the output of a summing amplifier 112 in the manner above described for driving a feed-back generator 111a and for gang-operation of the contacts 113, 114 and 115 of potentiometers 116, 117 and 118 respectively. These potentiometers are for the purpose of calculating the drag coefficient $C_D$, the lift coefficient $C_L$ and the moment coefficient $C_M$ respectively.

In addition to the aforesaid potentiometers, another potentiometer 140 is provided in the angle of attack servo system for the purpose of calculating a component of vertical air speed for purposes hereinafter described. The slider contact 141 of this potentiometer is gang operated as indicated with the other contacts 113, etc. The potentiometer has a grounded center tap and is energized at its opposite terminals by voltages representing a combined function of air speed and pitch attitude derived from the pitch servo system presently described.

The inputs of the $\alpha$ amplifier 112 include voltages representing gravity, the lift force ($C_L$) and centrifugal force ($F_c$) due to pitching. These inputs will be explained shortly.

The drag as related to angle of attack may be expressed as $$D = C_D(\alpha) \rho \frac{v^2 S}{2}$$

where D is the drag in pounds, $\rho$ is the density of air, $C_D$ ($\alpha$) is the drag coefficient and S is the projected wing area. Therefore drag can be considered a function of $v^2$, i.e., air speed squared. For representing this relationship the potentiometer 116 is appropriately contoured and energized at its opposite terminals by a voltage $-v^2$ taken from the potentiometer 104 of the air speed system. The mid-part of potentiometer 116 is grounded through a resistor 200 at the angle of attack where the drag coefficient $C_D$ ($\alpha$) is zero and contact 113 is connected by conductor 113a to the air speed amplifier 100. Accordingly, the derived voltage at contact 113, since it varies with change in angle of attack generally according to the above relationship can be used as an input $C_D$ to the air speed amplifier. The gravity input (G) depending on the pitch attitude of the aircraft involves additional servo systems that will be presently described.

The inputs to the angle of attack ($\alpha$) amplifier 112 will now be considered. The gravity factor which as above pointed out is affected by climb and dive attitudes may be divided into two components which are fed to the angle of attack and air speed amplifiers 112 and 100 respectively. In practice these gravity inputs are 90° components, i.e. the air speed component is along the flight path and the angle of attack component is perpendicular thereto. In the present illustration the $v$ and $\alpha$ gravity components are derived by a pair of contacts 122 and 123 from the potentiometer 119 of the "pitch" ($\theta$) servo system indicated, the pitch amplifier 120 in turn being energized to operate the motor 121, etc., from a "rate-of-pitch" system presently described. The pitch potentiometer 119 is suitably contoured (cosinusoidal in the present instance) and grounded at points 180° apart to represent both normal and inverted level flying, and the potentiometer is energized at points intermediate the grounded points by voltages $-E$ and $+E$ representing climb (negative) and dive (positive) gravity values respectively. The derived voltage at contact 122 represents the gravity component $-W \sin \theta$ which (at low angles of attack) represents the effect of aircraft weight in increasing or decreasing thrust and hence air speed, and is fed by conductor 122a to the $v$ amplifier 100. The derived voltage at the contact 123, which is spaced 90° from contact 122 represents the gravity component $W \cos \theta$ to be supported by lift derived through angle of attack and is fed by conductor 123a to the $\alpha$ amplifier 112.

The pitch servo system also includes a cosinusoidal potentiometer 142 that is energized as indicated according to air speed for deriving at the 180° spaced slider contacts 142' and 144 oppositely phased component voltages $+v \cos \theta$ and $-v \cos \theta$ respectively. These voltages are used to energize the angle of attack potentiometer 140 previously referred to so that the resulting derived voltage at contact 141 represents a component of vertical air speed, namely, $v \cos \theta \sin \alpha$. This voltage and the voltage $v \sin \theta$ derived from the pitch potentiometer 142 at contact 143 are led by conductors 141' and 143' respectively to a "rate of climb"

$$\frac{(dh)}{(dt)}$$

system hereinafter described. The resultant of these two voltages, namely $v \sin \theta - v \cos \theta \sin \alpha$, represents the vertical air speed vector $v \sin (\theta - \alpha)$ as can be readily demonstrated, assuming $\alpha$ to be small.

Referring again to the angle of attack system, the lift L (in pounds) may be expressed by the formula $$L = C_L(\alpha) \rho \frac{v^2 S}{2}$$

where $C_L$ ($\alpha$) is the coefficient of lift. Therefore lift also is a function of air speed squared and depends on the type of aircraft simulated. Accordingly the potentiometer 117 the $\alpha$ system for determining lift coefficient is appropriately contoured for the coefficient $C_L$ ($\alpha$) of the particular airplane simulated and is grounded at its mid-portion at the value of angle of attack at which the lift coefficient is zero and energized at its upper and lower terminals by voltages $-v^2$ and $+v^2$ respectively derived from the air speed potentiometer 104. The instantaneous positive value of $v^2$ may be suitably obtained by means of a 180° phase shifter as indicated. Accordingly the contact 114 of the potentiometer 117 derives a lift force voltage which is applied as an input to the $\alpha$ amplifier 112. There is also an input to the angle of attack system representing centrifugal force ($F_c$) and this input is derived from potentiometer 160 of the air speed servo system above described, centrifugal force corresponding to the product of $\omega_y$ and $v$.

The inputs to the "rate of pitch" system include a so-called pitching moment input ($C_m$) derived from the potentiometer 118 of the angle of attack system. This pitching moment expressed as $$C_M(\alpha) \rho \frac{v^2 S}{2}$$

is also a function of air speed squared. The potentiometer 118 is grounded at its mid-portion at the angle of attack where the pitch moment is zero and is energized by voltages $-v^2$ and $+v^2$ as in the case of potentiometer 117, and is also appropriately contoured so that the pitching moment voltage at the slider contact 115 varies according to the desired characteristics of the particular airplane. This voltage is fed by conductor 115a to the summing amplifier 125. The other input ($M_P$) of amplifier 125 represents the pitching moment in ft.-lbs. produced by the pilot-operated elevator control tending to cause pitching and is derived from the elevator potentiometer 124 that is in turn energized according to a function of air speed by voltages $+v$ and $-v$. The mid-portion of the potentiometer is grounded to represent approximately level flying or zero pitch. Accordingly the slider contact 124a of the elevator potentiometer selects a voltage that may be represented as the pitching moment ($M_P$) in foot-pounds and that is fed to the rate of pitch amplifier 125. It is to be noted that in the case of the foregoing circuits a positive ($+$) designated signal increases air speed, changes angle of attack, rate of pitch and pitch in the conventionally positive direction. In addition to the aforesaid inputs for the rate of pitch system, a voltage derived from the "rate of climb"

$$\frac{(dh)}{(dt)}$$

system above referred to and representing a stabilization factor is preferably fed to the amplifier 125. This factor will be considered later in more detail in connection with the rate of climb system.

The output of the rate of pitch summing amplifier 125 is a voltage representing the computed value of rate of pitch. In order to use this voltage properly in the computing system, the amplifier output energizes the primary winding 127 of a transformer 130 the secondary winding of which produces oppositely phased voltages at terminals 128 and 129 representing respectively $+\omega_y$ and $-\omega_y$. The voltage $+\omega_y$ is fed by conductor 128b to the air speed potentiometer 160 for deriving the centrifugal force voltage $F_c$ as previously stated. Also this voltage is used as an input (conductor 128a) for the pitch integrating system above referred to. The voltage $-\omega_y$ is used as a feed-back voltage for the amplifier 125.

The time integrated value of $\omega_y$ represents the pitch attitude or angle ($\theta$) of the aircraft. This integrating operation is performed according to the output of the pitch amplifier 120 by means of the pitch servo motor 121 and feed-back generator 121a. The pitch servo provides the two gravity components above referred to (potentiometer 119) but also through the servo shaft position the instant angle of pitch. Accordingly the pitch element of an attitude gyro 185 can be operated from the pitch motor 121 as indicated in Fig. 2 if desired.

The use of the feed-back generators for rate control is particularly important, the pitch servo integrating system serving as an important example. If the motor 121 alone were relied upon to perform the pitch integrating operation the natural inertia of the driving mechanism would introduce such a large error that from a practical standpoint the system would not be useful. However, with the feed-back generator connected in the system as shown, the generated feed-back voltage $E_{fb}$ constitutes an input for the pitch amplifier and is of such phase relation to the summed or resultant input signal that it opposes the same, i.e. in the manner of degenerative or negative feed-back. With large gain in the control amplifier the speed of the motor according to well-known principles is therefore caused to have a linear speed response to the magnitude of the input signal, i.e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

In accordance with the present invention, in the embodiment of Fig. 1 the rate of change of pitch signal is applied from the generator 121a over conductor 155' as an input $$\frac{d\theta}{dt}$$

to the rate of climb servo amplifier 145, in addition to being applied as velocity feed-back voltage $E_{fb}$ to the pitch servo amplifier 120. As will be apparent hereinafter, the application of input signal $$\frac{d\theta}{dt}$$

to the rate of climb amplifier 145 tends to "jog" the rate of climb system under transient conditions of initial "nosing up" of the aircraft in response to opening of the throttle.

It is also to be noted that the variation in the various forces and moments such as gravity, lift, centrifugal force, thrust, drag, pitching moment and the like are accomplished by the change in contact brush position on the respective potentiometers together with variation in the potentiometer energizing voltage, whereas the relative magnitude of each of the aforesaid forces and moments is determined by the value of the input resistance to the various amplifiers. As a specific example, the relative magnitude of lift is affected by the values of air density ($\rho$) and the constant factor $$\frac{S}{2}$$

In the present illustration $\rho$ is also considered a constant and hence these terms determine the resistance value of the input indicated at $C_L$ to the amplifier 112. Lowering the value of the resistance increases the relative magnitude of the above constant.

Referring now to the rate of climb $$\frac{(dh)}{(dt)}$$

system, the servo amplifier 145 is connected to the servo motor 146 for driving the feed back generator 146a and the slider contacts 147 and 148 of the respective potentiometers 149 and 150 through a gear box 146b. An indicator 151 representing rate of climb (vertical air speed) is also mechanically connected as indicated at 146c to the contact drive means.

The inputs to the rate of climb amplifier 145 include the vertical air speed component voltages $v \sin \theta$ and $-v \cos \theta \sin \alpha$ above referred to, the summation of which represents the vertical air speed vector, the auxiliary signal voltage $$\frac{d\theta}{dt}$$

previously referred to, which is derived from the feed back circuit of the pitch servo system, and an "answer" voltage $$\frac{dh}{dt}$$

from the potentiometer 150. This potentiometer has a grounded center tap to represent level flight and is energized by oppositely phased voltages as indicated so that the derived voltage at contact 148 represents dive or climb rate.

Since the time integration of rate-of-climb is altitude, the voltage $$\frac{dh}{dt}$$

from potentiometer 150 can also be used to operate an integrating servo motor 166 that is connected through suitable reduction gearing 166b to an indicator 153 representing altitude. The motor 166 is of the reversible two-phase type as above described for operation according to representations of dive or climb.

The stabilization factor potentiometer shown at 149 is designed to derive a voltage representing the first derivative of rate of climb, i.e., the second derivative of altitude, $$\frac{d^2h}{dt^2}$$

for feed back input to the rate of pitch servo. The stabilization factor therefore represents acceleration and is zero only during a stable condition. The purpose of this feed back is to improve the stability of the vertical system and eliminate hunting in the "long period" oscillations with respect to the objective or desired flight path. Specifically, the potentiometer 149 is grounded at its end terminals and is energized at its center terminal by a velocity voltage from the feed back generator 146a, the energizing circuit from the generator winding including conductor 154 and a proportioning resistance 155. The derived voltage at contact 147 which is fed by conductor 147' to the rate of pitch amplifier 125 is opposite in polarity to the elevator derived voltage $M_P$ and tends to restore the pitch servo to its original position.

The "response" circuit of the present invention is adapted to modify the rate of climb circuitry according to rate of change in pitch attitude, thereby introducing more realism in the "short period" oscillations and phugoid of the vertical system. To this end, the feed back voltage $$\frac{d\theta}{dt}$$

from the pitch servo generator 121a is fed directly by conductor 155' to the input of the $$\frac{dh}{dt}$$

amplifier 145.

The operation of the interacting network in respect to the air speed meter reading will now be described. In actual level flying for example when the throttle is opened wider the air speed increases and the nose of the aircraft lifts, the converse taking place during closing of the throttle. Referring to the drawing, as the throttle potentiometer contact 110 is moved downward for example toward the open throttle position, the derived input thrust voltage T for the amplifier 100 increases thereby unbalancing the air speed servo system and causing the servo motor 101 to run in a direction moving the potentiometer contacts 106, 107, etc., upward as shown toward increased air speed so that the following takes place in the air speed potentiometer system 102; (1) the derived air speed voltage $v$ increases, (2) the derived $v^2$ voltage increases as the square of air speed, (3) the derived voltage representing the reciprocal of air speed $$\frac{1}{v}$$

decreases, (4) the derived voltage representing centrifugal force $F_c$ increases, and (5) the air speed meter 24 indicates a higher air speed value. However the air speed cannot increase indefinitely because the constant coefficient drag increases with $v^2$ as does the $C_D$ ($\alpha$) drag. Also at the same time the thrust, which varies with the reciprocal of air speed, decreases as the new equilibrium is reached.

Now, as the values of both $v$ and $v^2$ increase, the angle of attack system is in turn unbalanced since the centrifugal force and lift coefficient inputs from the potentiometer 160 of the air speed system and from the potentiometer 117 of the angle of attack system, both of which are dependent on $v$ and $v^2$ respectively, are now increased. Also the gravity input from the pitch system is changed as will presently be described. Accordingly, the servo 111 starts running in a direction searching for a new balance position and finally moving the potentiometer contacts 113, 114 and 115 downward toward decreased angle of attack indication. As this operation progresses the derived voltages from the three $\alpha$ potentiometers 116, 117 and 118 are used as follows: (1) The derived drag voltage (negative) from potentiometer 116 is used as an input ($C_D$) for the air speed amplifier and increases in magnitude so as to oppose the increased thrust voltage (positive) derived from the higher throttle setting above referred to. (2) Since the wing lift of an aircraft must balance any centrifugal force and weight component acting perpendicular to the wing, the derived lift voltage ($C_L$) from potentiometer 117 must balance both the gravity factor $G\alpha$ and the centrifugal force $F_c$. Assuming that the plane was initially in level flight, the centrifugal force is zero and hence the tendency of increased air speed is to reduce the angle of attack which will tend to become more negative. This tendency is opposed by a change in pitching moment. (3) The derived moment voltage from potentiometer 118 which is an input ($C_M$) for the rate of pitch amplifier 125, becomes more positive with decreasing angle of attack and thereby causes an unbalance in the rate of pitch inputs to produce a new value of rate of pitch and hence, through the air speed potentiometer 160 a new centrifugal force voltage $F_c$ for the amplifier 112 which produces an equilibrium restoring tendency at the $\alpha$ servo. Concurrently the increase in voltage $\omega_y$ results in an increased input voltage at the pitch integrating servo system $\theta$. Accordingly, all four systems are now functioning in a combined computing and integrating operation necessary to determine the new air speed reading and pitch attitude.

As the pitch system is unbalanced toward a position of more positive pitch, i.e. climb, the derived voltages at potentiometer contacts 122 and 123 representing the gravity (weight) input components for the $v$ and $\alpha$ amplifiers respectively vary in magnitude, the $v$ component increasing and the $\alpha$ component decreasing in the present instance as it will be apparent that if the aircraft nose were pointed toward zenith the weight component in the direction of aircraft movement would then represent $-W$ and the weight component perpendicular to the wings, i.e. the $\alpha$ servo component would be zero. At intermediate aircraft attitudes the components are vectorially resolved.

The negative weight component ($-W \sin \theta$) to the air speed servo tends to reduce the maximum velocity the aircraft will reach with the increased throttle setting. At the same time the wing lift required is decreased due to decrease of the $W \cos \theta$ value ($G \alpha$) at the $\alpha$ amplifier 112. This allows a further reduction in angle of attack and additional reduction in the negative pitching moment voltage ($C_M$) to the rate of pitch amplifier 125 which in turn produces a more positive value of $\omega_y$ thus increasing the effect on the pitch and angle of attack servos until finally these servos have overrun and have produced too great a change in the weight components for equilibrium. Consequently there is dropping off of air speed. This in turn results in a decreased lift voltage ($C_L$) at the $\alpha$ amplifier 112 so that the angle of attack is increased and a larger negative pitching moment voltage is produced at potentiometer 118 for the $\omega_y$ amplifier 125. The value of $\omega_y$ decreases to control the pitch integrating servo so as to reduce the pitch attitude until it finally becomes negative. The $W \sin \theta$ component ($G_v$) to the air speed servo has now become positive, thereby aiding thrust so that the air speed once more increases and the cycle reverses eventually damping itself to a final equilibrium position consistent with the new throttle setting.

In the foregoing manner the damped wave path for vertical oscillation of an aircraft is reproduced so that the simulation is more realistic. The degree of damping of the wave path is dependent on the choice of the circuit constants including percentage of velocity feedback, gear ratios, relative input magnitudes and the positions of potentiometer center taps.

Because of this vertical oscillation due initially to "nosing up" of the aircraft in response to opening of the throttle, there will of course be indications of vertical airspeed, depending primarily on the airspeed and pitch attitude as represented by potentiometer 142 of the pitch system. The derived voltage $v \sin \theta$, which represents a vertical vector, is modified by angle of attack at potentiometer 140 so that the derived voltage represents $v \cos \theta \sin \alpha$ and this voltage is in turn subtracted from the pitch derived voltage at amplifier 145 to represent the actual vertical component. The rate of climb motor 146 is operated according to this resultant voltage as modified by the rate of pitch change voltage $$\frac{d\theta}{dt}$$

which in turn causes operation of the potentiometers 149 and 150 and positioning of the rate of climb and altimeter indicators 151 and 153 in the manner above described. The voltage $$\frac{d\theta}{dt}$$

conventionally designated $\theta$, is polarized so as to be opposite the aforesaid resultant voltage at the input of the rate of climb amplifier 145, thereby tending to "jog" the rate of climb system which in turn realistically affects the pitch and altitude systems. The invention is particularly applicable in case of a simulated landing approach where the airspeed is low and the "stick" is suddenly pulled back to bring up the "nose." The response is immediate and well-defined as in actual flight. The stabilization voltage from the rate of climb potentiometer 149 tends to damp the "long period" vertical oscillation above referred to since it is polarized so as to oppose the elevator moment and hence tends to dampen pitch.

It has been assumed during the above explanation that the throttle setting only has been changed and that the elevator control remained in normal level flight or neutral position. When the elevator control is adjusted, a derived voltage corresponding to the turning moment is used for controlling a rate system, i.e. the rate of pitch system from which is derived a voltage used in connection with the airspeed servo to produce a voltage representing centrifugal force. This force voltage is an input for controlling the angle of attack servo for deriving a rate input voltage of opposite sense but equal in magnitude to the first moment voltage. Also, this same force voltage controls the derivation of another input force voltage representing lift which has a polarity of opposite sense and builds up to offset the effect of the original force voltage. This illustrates in general how a balance is established between rate of pitch and angle of attack.

An elevator control operation will now be described in particular. When the elevator is moved toward a dive position for example, the contact 124a is lowered and the derived elevator potentiometer voltage representing pitching moment, assuming for example that the contact 124a was originally in a climb position, first decreases in magnitude to the level flight indication and then reverses in polarity and increases in opposite magnitude thereby unbalancing the rate of pitch system inputs so that a new value of $\omega_y$ opposite in polarity results. The servo 121 of the pitch system which is energized by the $\omega_y$ voltage rotates now in the direction toward negative pitch (dive) thereby increasing the derived voltage at contact 122, i.e. the weight component ($-W \sin \theta$) to the $v$ system becomes positive and acts to increase airspeed. The motor 111 of the $\alpha$ system, which receives as control signal $F_c$ representing $v$ and $\omega_y$ now also rotates in the opposite direction toward negative $\alpha$. This last operation causes the $C_M$ voltage fed to the rate of pitch system to become more positive thereby tending to stabilize said system. Concurrently, the movement of the $\alpha$ servo has changed the $C_D$ potentiometer derived voltage at contact 113, thereby changing the drag input at the $v$ system tending to modify the airspeed reading.

Since a dive attitude represents negative pitch, the contacts 143 and 144 of the pitch potentiometer 142 are positioned beneath the respective ground taps to derive negative and positive voltages respectively. Thus the polarity at the terminals of angle of attack potentiometer 140 is reversed so that the polarity of the derived voltage is also reversed for energizing the rate of climb servo in the negative or rate of dive direction. The resulting modified airspeed voltage causes in turn modification of the derived voltages from the pitch potentiometer 142 and the angle of attack potentiometer 140 which represent the vertical components of airspeed for energizing the rate of climb servo system. Thus, changes in angle of attack, pitch attitude and airspeed are all reflected in the rate of climb reading at indicator 151. When the elevator control is relaxed for "flattening out" the dive, the rate of pitch system is unbalanced by the decrease in the input voltage $M_P$ so as to produce a more positive change or increase in both the centrifugal force voltage $F_C$ and the rate of pitch voltage. Since these voltages tend to operate both the angle of attack and pitch servos toward more positive values, the airspeed is not only decreased as above pointed out but the vertical components of airspeed are reduced due to operation of the rate of climb servo toward neutral as the inputs thereof decrease.

Consequently there is a repetition of the interaction above described among the four systems until the airspeed, angle of attack and dive attitude correspond to the aircraft power and elevator position.

During the above described dive control operation the $\alpha$ system seeks a balance depending on the inputs representing respectively centrifugal force from the rate of pitch and airspeed systems and the gravity component from the pitch system on the one hand, and the lift coefficient from the changed angle of attack on the other hand, the resultant of these inputs operating the motor 111 in the positive or negative direction as the case may be and becoming balanced when the rate of pitch and the pitch systems become stabilized.

The above description of the operation of the airspeed servo system, including operation of the airspeed meter is intentionally simplified for the purpose of illustrating the interaction of the servo systems, each of which represents a certain flight condition or a system rotatable about a definite axis of the aircraft, such as the pitch axis for example.

In brief, the air speed meter reading and hence the vertical air speed and altitude readings in the system above described depends not only on the engine thrust component but also on retarding or modifying components that depend in turn on the angle of attack, rate of pitch and angle of pitch involving also the elevator control. A change in any one of the above factors or components necessarily affects the related systems generally tending to unbalance them so that in practice the complete system is continuously searching for a position of balance, thereby simulating the inherent aerodynamic equilibrium of aircraft.

During all these interactions of the servo systems on each other, the rate of climb servo which is modified by the aforesaid pitch rate voltage $\theta$ or $$\frac{d\theta}{dt}$$

responds and in so doing produces a stabilizing voltage representing the second derivative of altitude of such sense or polarity as to oppose further change in flight path inclination and to stabilize the "aircraft" with respect to the so-called Y axis, i.e. the line passing through the center of gravity along the wings. This voltage tends to restore an equilibrium flight path condition, particularly in seeking a constant rate of climb by opposing any change in the rate of climb.

It will be understood that the present invention involving the modifying circuit between the pitch and rate of climb systems for modifying the operation of the rate of climb servo by a pitch rate voltage ($\theta$) can if desired be used in a vertical system independently of the stabilizing voltage ($\dot{h}$) for the rate of pitch system; also it can be advantageously used as shown so as to be supplemented by the prior stabilizing circuit.

As can be readily demonstrated, the rate of pitch change $$\frac{(d\theta)}{(dt)}$$

is also the resultant of $\omega_y \cos \phi - \omega_z \sin \phi$, where $\phi$ is the roll angle, $\omega_y$ the rate of change about the $y$ axis of the aircraft and $\omega_z$ the rate of rotation about the $z$ axis. Accordingly, auxiliary voltages representing $\omega_y \cos \phi$ and $\omega_z \sin \phi$ may be combined and used in accordance with the present invention as illustrated in Fig. 2 wherein components of the lateral or yaw system as well as the longitudinal or vertical system are used.

Referring to Fig. 2, the rate of yaw ($\omega_z$) system is shown as primarily controlled by a potentiometer 170, the slider contact 171 of which is positioned according to rudder deflection. The potentiometer, as in the case of the elevator potentiometer of Fig. 1, is grounded at its midportion and is energized at opposite terminals by airspeed function voltages representing $+v$ and $-v$ for producing derived voltages representing right and left turning moments respectively. This moment voltage is an input for the rate of yaw summing amplifier 172, the output of which is fed to a transformer 173 for producing voltages at the secondary terminals 174 and 175 of opposite instant polarity representing rate of yaw. It is not necessary for present purposes to illustrate additional circuits for controlling the rate of yaw system as representative circuits are shown in my aforesaid Patent No. 2,842,867.

The roll system ($\phi$) is energized in like manner by derived voltage from potentiometer 176, the slider contact 177 of which is positioned according to aileron deflection. The aileron potentiometer 176 is energized in the manner of the rudder and elevator potentiometers by oppositely polarized voltages representing airspeed so as to produce a voltage representing roll moment. The roll servo amplifier 178 is energized primarily by this moment voltage and also by voltages from other circuits as disclosed in more detail in my aforesaid Patent No. 2,842,867. The roll servo system is generally similar to the servo systems of Fig. 1 and comprises a servo motor 179 energized according to the output of amplifier 178, and a feed back generator 179a for producing a feed back voltage for the roll amplifier. The motor generator set is connected through a gear box 179b and mechanical connections 179c to a pair of cosinusoidal potentiometers 180 and 182 displaced 90° with respect to each other for producing at the slider contacts 181 and 183 respectively derived voltages corresponding to functions of roll, rate of pitch and rate of yaw. The potentiometer 180 is energized by oppositely polarized voltages representing rate of pitch from the terminals 128 and 129 of the rate of pitch transformer of Fig. 1 and the potentiometer 182 is energized by oppositely polarized voltages representing rate of yaw from the terminals 174 and 175 of the rate of yaw transformer 173. Accordingly, there is produced at the slider 181 a voltage representing $\omega_y \cos \phi$, and at the slider 183 a voltage representing $\omega_z \sin \phi$. The resultant of these two voltages in the expression above referred to represents $$\frac{d\theta}{dt} \text{ or } \dot{\theta}$$

The pitch servo system ($\theta$) can therefore be energized by these component voltages so as to position the integrating pitch servo according to pitch attitude. To this end, the slider 181 is connected by conductor 181' to the input of the pitch amplifier 120, as is also the slider 183 by conductor 183'. The elements of the pitch servo system correspond generally to those of Fig. 1. The mechanical output of the servo at connection 121c may be connected to the pitch element of a simulated attitude gyro 185 and the roll servo connection 179c may be connected to the roll element of the gyro.

The altitude integrating servo system ($h$) obtains its input control signals from circuits previously disclosed in Fig. 1. That is, the amplifier 165, in addition to its feed back voltage from the servo generator 166a, is energized by voltages representing $v \sin \theta$ and $-v \cos \theta \sin \alpha$ from the potentiometers 142 and 140 respectively of Fig. 1. The altitude servo corresponds in other respects to that of Fig. 1. The altitude servo feed back voltage $$\frac{dh}{dt}$$

is in the present instance used to energize the rate of climb $$\frac{(dh)}{dt}$$

servo together with other voltages presently described. The input voltages for the rate of climb servo amplifier 145 include the following:

(1) a feed back voltage from the servo generator 146a representing $$\frac{d^2h}{dt^2}$$

(2) A main energizing voltage $$\frac{-dh}{dt}$$

on conductor 186 from the altitude servo feed back circuit;

(3) A voltage on conductor 183' representing $-\omega_z \sin \phi$ from $\phi$ potentiometer 182;
(4) A voltage representing $\omega_y \cos \phi$ on conductor 181' from $\phi$ potentiometer 180, and
(5) An "answer" voltage $$\frac{dh}{dt}$$

on conductor 148' from the "answer" potentiometer 150.

Thus the altitude servo feed back voltage $$\frac{dh}{dt}$$

is employed to control the rate of climb position servo $$\frac{dh}{dt}$$

Since for positive rates of climb the input control signal is considered negative $$\frac{(-dh)}{dt}$$

all the damping voltages into this servo are of opposite polarity. These voltages include the counter-acting position feed back voltage $$\frac{+dh}{dt}$$

the servo damping voltage from the rate of climb feed back generator $$\frac{+d^2h}{dt^2}$$

and the modifying voltages introduced according to this invention, namely, $+\omega_y \cos \phi$ and $-\omega_z \sin \phi$.

Whether the modifying potential is used as a single voltage $-\dot{\theta}$ or as components $\omega_y \cos \phi - \omega_z \sin \phi$ is primarily dependent on whether a net positive or negative signal is required for input to the system to be affected. Any other voltage or combination of voltages representative of $\omega_y$ or $$\frac{d\theta}{dt}$$

may be employed for improved response simulation in the manner above described. It will be understood that the term "potential" where used in the claims to indicate a modifying input for the rate of climb system is intended to include either a single voltage as shown in Fig. 1 or the resultant of a plurality of voltages as shown in Fig. 2.

The systems illustrated in Figs. 1 and 2 wherein a rate of angular change factor is utilized to modify a system representing a function of axis translation are therefore useful in more realistically simulating control response, including the "short period" oscillation of aircraft, thereby providing for greatly improved control response of the over-all simulating apparatus.

This invention is particularly useful in application of the vertical system to glide beam indication (ILS System) wherein the altitude means is used to control the cross-pointer needle for glide beam indication as in my Patent No. 2,560,528 granted July 10, 1951 for "Training Means for Blind Navigating Systems." Specifically, for this case, the $\theta$ modifying voltage is preferably fed directly to the altitude system rather than to the rate-of-climb system, as it is essential for landing approach training that the cross-pointer needle of the glide beam indicator respond promptly and realistically to sudden deflections of the elevator control as in actual flight. The essential change in circuitry here involves simply switching the modifying voltage $\dot{\theta}$ from the rate of climb system input to the altitude system input so that a small rate-of-pitch-change signal is effective to produce a definite reaction in the altitude system which in turn controls the glide beam cross-pointer needle.

It should therefore be understood that this invention is not limited to specific details of construction and arrangement thereof herein illustrated, and that changes and modifications may occur to one skilled in the art without departing from the spirit of the invention.

What I claim is:

In flight simulating apparatus having simulated aircraft flight controls including an aircraft attitude control operable by a pilot, computing means responsive to the operation of said controls for determining simulated angular rate of change of the aircraft with respect to its axes and simulated translation of said axes in space, and indicating means responsive to said computing means for representing attitude and vertical state flight conditions, said computing means comprising an electrical servo system for simulating a vertical state condition, and further comprising means for producing control potential representing the vertical component of air speed according to simulated air speed and attitude of the aircraft, said servo system being responsive to said control potential for normal steady-state and transient operation thereof; and further comprising electrical means responsive to transient movement of the attitude control for producing other signal potential in addition to said control potential, said other signal potential representing in magnitude and sense an angular rate of change of the aircraft about its pitch axis: the improvement comprising means for applying said other signal potential separately from said control potential to said vertical state servo system for modifying the transient operation of the latter system for ensuring more realistic response of said latter system to a transient condition caused by movement of the attitude control as distinguished from a static condition thereof.

References Cited in the file of this patent

UNITED STATES PATENTS

| | | |
|---|---|---|
| 2,628,434 | Dehmel | Feb. 17, 1953 |
| 2,636,285 | Fogarty et al. | Apr. 28, 1953 |
| 2,731,737 | Stern | Jan. 24, 1956 |